United States Patent
Teulings et al.

(10) Patent No.: US 7,323,865 B2
(45) Date of Patent: Jan. 29, 2008

(54) DEVICE FOR DETERMINING THE ANGULAR POSITION AND ROTATION SPEED OF A ROTARY MEMBER

(75) Inventors: Willem Teulings, Fontenilles (FR); David Raynaud, Paris (FR)

(73) Assignee: Siemens VDO Automotive, Toulouse (FR)

( * ) Notice: Subject to any disclaimer, the term of this patent is extended or adjusted under 35 U.S.C. 154(b) by 8 days.

(21) Appl. No.: 10/581,300

(22) PCT Filed: Aug. 18, 2004

(86) PCT No.: PCT/EP2004/009238

§ 371 (c)(1), (2), (4) Date: Jun. 29, 2006

(87) PCT Pub. No.: WO2005/054785

PCT Pub. Date: Jun. 16, 2005

(65) Prior Publication Data

US 2007/0273368 A1 Nov. 29, 2007

(30) Foreign Application Priority Data

Dec. 2, 2003 (FR) .................................. 03 14116

(51) Int. Cl.
*G01B 7/30* (2006.01)
(52) U.S. Cl. .............................. 324/207.2; 324/207.25; 324/174
(58) Field of Classification Search ............. 324/207.2, 324/207.21, 207.24, 207.25, 173–174; 338/32 R, 338/32 H
See application file for complete search history.

(56) References Cited

U.S. PATENT DOCUMENTS

| | | | | |
|---|---|---|---|---|
| 4,982,155 A | * | 1/1991 | Ramsden | ................. 324/207.2 |
| 5,796,247 A | | 8/1998 | Pape | |
| 6,212,783 B1 | * | 4/2001 | Ott et al. | .................... 33/1 PT |

FOREIGN PATENT DOCUMENTS

DE 197 22 016 12/1998

* cited by examiner

*Primary Examiner*—Jay M Patidar
(74) *Attorney, Agent, or Firm*—Young & Thompson

(57) ABSTRACT

A device for determining the angular position and rotation speed of a rotary member. The inventive device includes a sensor having a fixed part and a rotary part which is linked to the rotary member. The rotary part bears a magnetic flux generator, while the fixed part includes: a first probe which generates an electric signal having two different levels as a function of the angular position of the rotary member; and a second probe which is angularly offset in relation to the first probe and which generates an electric signal as a one-way function of the angular position of the rotary member for each segment of revolution corresponding to a level of the electric signal generated by the first probe. Analysis elements having elements for unequivocally defining the angular position of the rotary member, and for calculating the rotation speed of the rotary member are provided.

10 Claims, 2 Drawing Sheets

DEVICE FOR DETERMINING THE ANGULAR POSITION AND ROTATION SPEED OF A ROTARY MEMBER

The invention relates to a device for determining the angular position over 360° and rotation speed of a rotary member driven by a rotation movement about a rotation direction.

The invention aims in particular to determine the absolute angular position over 360° of the camshaft of an internal combustion engine, the device being placed inside the engine compartment of a motor vehicle.

More specifically, the aim is to improve the starting of multi-cylinder internal combustion engines and reduce the pollution from these engines in the starting phase, on the one hand by a better knowledge of the position of each piston in order to select the cylinders to be supplied with fuel, and by the accurate knowledge of the rotation speed of the engine on the other hand.

U.S. Pat. No. 6,212,783 discloses a device for determining the angular position over 360° of a rotary member comprising:

a sensor consisting of a fixed part and a rotary part linked to the rotary member, said rotary part bearing a magnetic flux generator and said fixed part comprising:

a first probe generating an electrical signal having two different levels as a function of the angular position of the rotary member, each level corresponding to a range of angular positions of the rotary member covering a segment of revolution, said levels being separated from each other by a discontinuity, a second probe angularly offset in relation to the first probe and generating an electrical signal as a univalent function of the angular position of the rotary member for each of the segments of revolution corresponding to a level of the electrical signal generated by the first probe, analysis means comprising first means univalently defining over 360°.

More specifically the second probe delivers an electrical signal varying linearly as a function of the angular position of the rotary member between 0° and 180°, and between 180° and 360°. From this signal, the absolute angular position over 180° of the rotary member is determined. The first probe delivers a binary signal for determining the absolute angular position over 360° of the rotary member.

It could seem logical to determine the rotation speed of the rotary member based on the linear variation of the electrical signal generated by the second probe using a "derivating" assembly. However, because of technological limitations, this solution has proved satisfactory hitherto only for relatively low rotation speeds (less than 50 revolutions per minute).

To cover a range of higher rotation speeds, such as the rotation speed of an internal combustion engine, in accordance with the invention, the device offers the following characteristics:

the sensor also comprises a summing assembly having an output at which is generated an output signal, said assembly summing the electrical signal generated by the first probe and the electrical signal generated by the second probe, such that the output signal comprises discontinuities corresponding to the discontinuities of the electrical signal generated by the first probe, and the analysis means are linked to the output of the sensor; they also comprise second means calculating the rotation speed of the rotary member.

The summing of the signals generated by the first and second probes can be done at a very low cost. It then makes it possible to define directly and based on a single electrical signal, univalently over 360°, the angular position of the rotary member and its rotation speed. Since the information needed to determine these two characteristics is combined in a single signal, all that is required is a single wire to link the sensor and the analysis means. The risks of malfunction and costs of implementing the device are thus reduced.

In a complementary manner, in accordance with the invention, the variation of the output signal between two discontinuities is less than the value of the discontinuities of the output signal.

Thus, the position of the rotary member is determined unambiguously.

Advantageously, the analysis means comprise a microcontroller having:

an analog input to define the angular position of the rotary member as a function of the electrical signal generated by the first probe and the electrical signal generated by the second probe, and a digital input for calculating the rotation speed of the rotary member as a function of the number of discontinuities of the electrical signal generated by the first probe, per unit of time.

Thus, the same microcontroller determines the absolute position over 360° of the camshaft and its rotation speed.

In a complementary manner, the analysis means also comprise a high-pass filter upstream of the digital input of the microcontroller and a by-pass upstream of the high-pass filter feeding the analog input.

Thus, the information for determining the rotation speed can easily but effectively be separated from the information for determining the angular position.

In an embodiment, the rotary part comprises a magnet generating said magnetic flux, the direction of magnetization of which is perpendicular to the rotation axis of the rotary part and the fixed part is positioned around the magnet and delimits two air gaps offset by roughly 90°, in which are placed the first and second probes.

Preferably, the variation of the electrical signal generated by the second probe as a function of the angular position of the rotary member is inverted for the angular positions of the rotary member corresponding to a discontinuity of the electrical signal generated by the first probe.

Advantageously, the first and the second probes are Hall-effect probes.

The cost of the Hall-effect probes is relatively low, so the cost of the sensor will be moderate.

Preferably, the first probe is a Hall-effect Switch probe of flip-flop type generating a binary electrical signal.

Such a probe offers a fast response enabling the rotation speed of the rotary member to be determined at high speeds.

In a complementary manner, the output of the first probe is linked to a voltage power source, and the output of the first probe and the output of the second probe are linked to an assembly summing the electrical signal generated by the first probe and the electrical signal generated by the second probe.

Thus, it is easy to obtain a multiple-level voltage source and a variable voltage source for which the signals can easily be added together.

The invention will become more clearly obvious from the description that follows, given with reference to the appended drawings in which.

Figure 1:
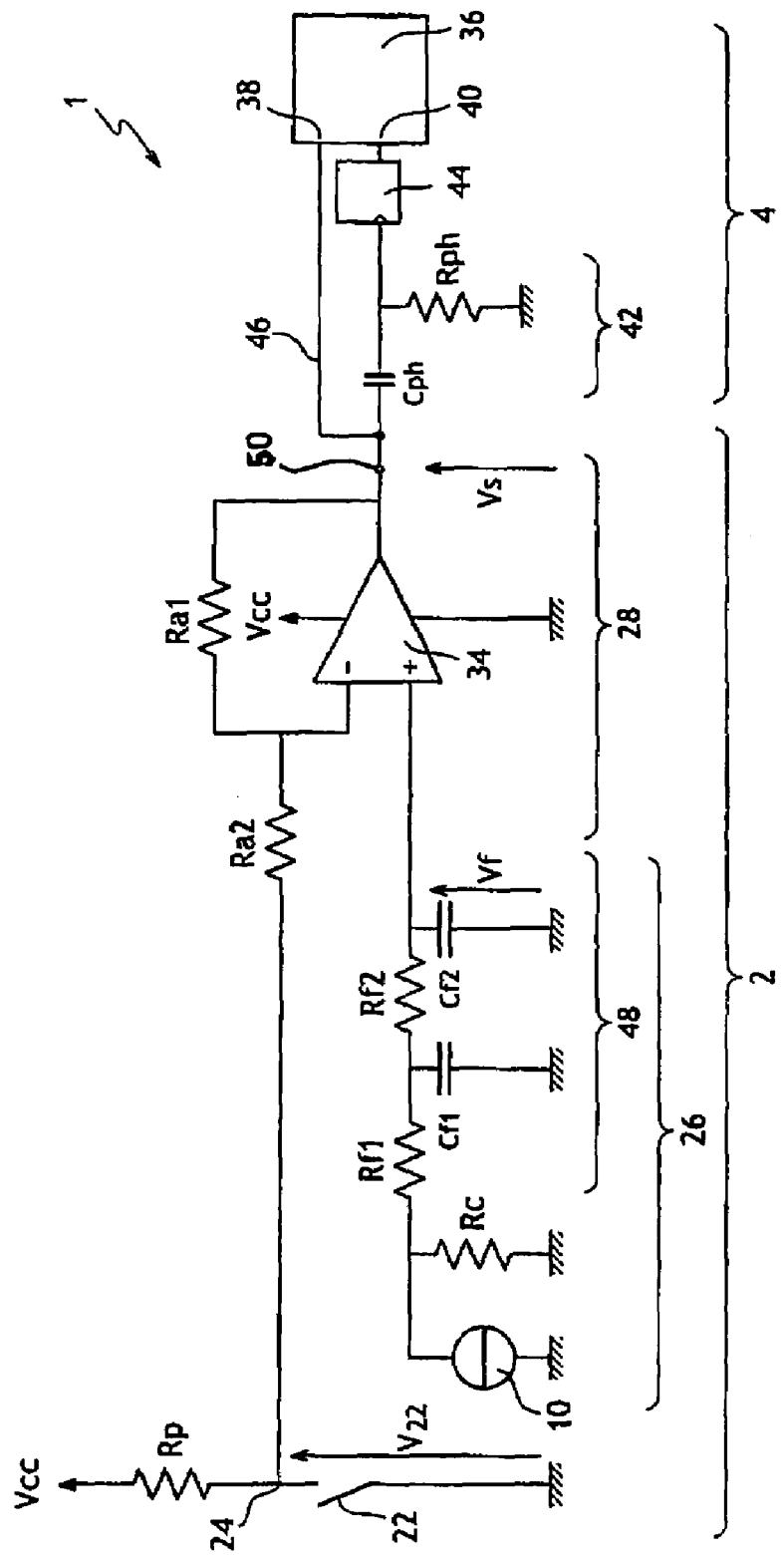
FIG. 1 is a diagrammatic representation of a device according to the invention.

FIG. 1 diagrammatically represents a device 1 consisting of a sensor 2 and analysis means 4.

Figure 2:
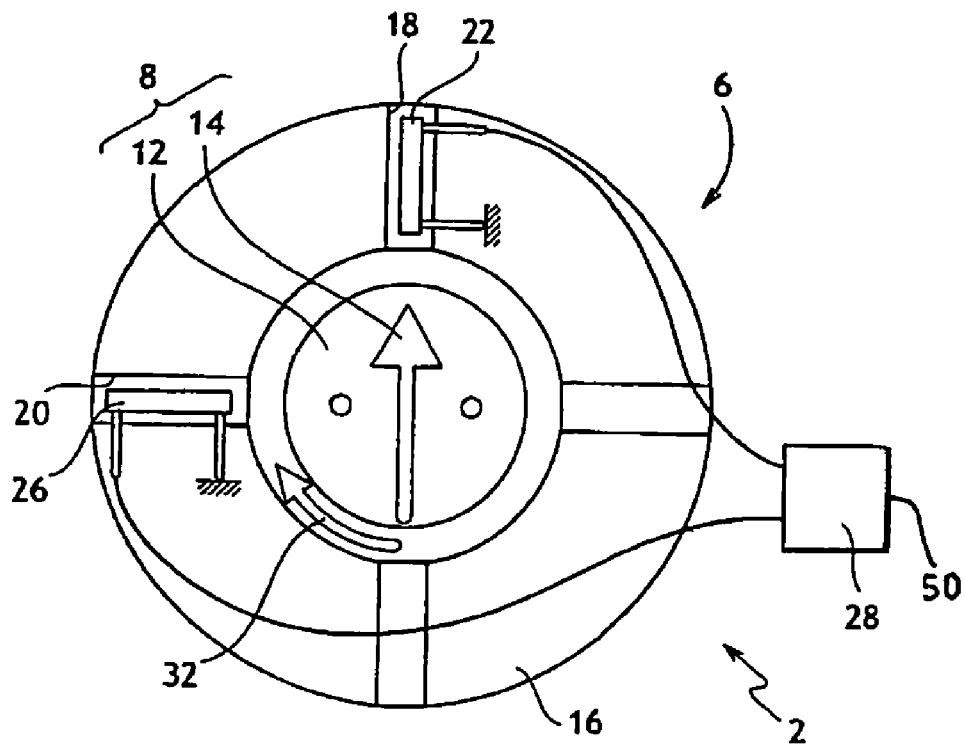
FIG. 2 is an in-situ representation of a sensor according to the invention.

The sensor 2 has an output 50. It consists of a fixed part 6 and a rotary part 8, as illustrated in FIG. 2. The rotary part 8 comprises a magnet 14 mounted on a rotary member 12, in this case a camshaft, driven rotation-wise as indicated by the arrow 32 and the angular position of which must be detected. The magnet 14 generates a magnetic flux. It is symbolized in FIG. 2 by its direction of magnetization. This direction of magnetization is diametrical, that is, roughly perpendicular to the rotation axis of the rotary member 12, said axis being perpendicular to the plane of FIG. 2. The magnet 14 is advantageously made up of a permanent magnet based on sintered rare earth elements in a plastic binder.

The fixed part 6 mainly comprises a polar element 16, a first Hall-effect probe 22, a second Hall-effect probe 26 and a summing assembly 28.

The polar element 16 is mounted around the magnet 14 and delimits a first air gap 18 and a second air gap 20 angularly offset by roughly 90° relative to the first.

Figure 3:
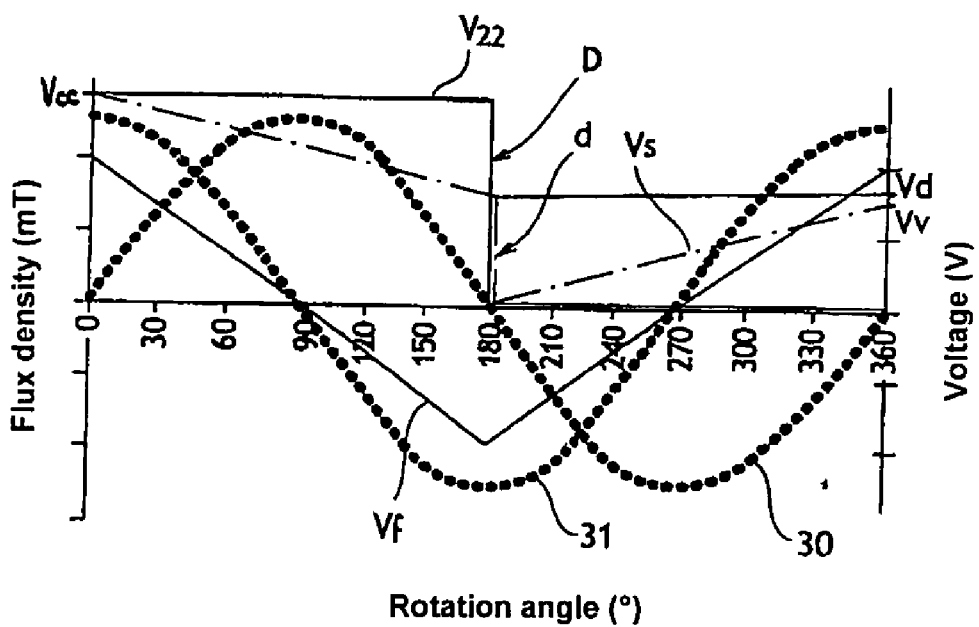
FIG. 3 represents the flux density to which each of the two probes of the sensor represented in FIG. 2 is subject, the electrical signal generated by each of these probes and the signal obtained at the output of the sensor.

The first air gap 18 contains the first Hall-effect probe 22. This Hall-effect probe 22 is of the flip-flop Switch type, such that the Hall-effect probe 22 therefore behaves as a switch. As illustrated in FIG. 1, the output 24 of the Hall-effect probe 22 is linked to a direct current power source Vcc via a resistor Rp. As illustrated in FIG. 3, the electrical signal $V_{22}$ generated by the Hall-effect probe 22 is a binary signal assuming in turn the constant value Vcc when the Hall-effect probe 22 is subject to a positive magnetic field 30, namely between 0° and 180°, and the zero value when the Hall-effect probe 22 is subject to a negative magnetic field 30, namely between 180° and 360°.

The second air gap 20 contains the second Hall-effect probe 26. This Hall-effect probe 26 in this case comprises a programmable probe 10 of the Micronas IC 856 type, generating a signal with variable pulse width as a function of the magnetic field 31 to which it is subject. This probe 10 is similar to a current source. It is transformed into a voltage source by the presence between its terminals of a resistor Rc. The Hall-effect probe 26 also comprises a second order passive low-pass filter 48 made up of two resistors $Rf_1$, $Rf_2$ and two capacitors $Cf_1$, $Cf_2$ to "average" the pulses.

As illustrated in FIG. 3, the signal Vf (voltage) generated by the Hall-effect probe 26, decreases linearly with the rotation angle between 0° and 180°, then increases linearly between 180° and 360°. Thus, at any voltage Vf within the range of variation, there are two corresponding rotation angles, one between 0° and 180°, and the other between 180° and 360°.

The summing assembly 28 comprises an operational amplifier 34 powered by the direct current source Vcc, a first resistor $Ra_1$ and a second resistor $Ra_2$. By choosing Rp to be negligible compared to $Ra_2$, the signal Vs output from the summing assembly 28 is such that:

$$-V_s = \left[1 + \frac{Ra_1}{Ra_2}\right]V_f - \frac{Ra_1}{Ra_2}V_{CC}$$

when the Hall-effect probe 22 behaves like an open switch, $$-V_s = \left[1 + \frac{Ra_1}{Ra_2}\right]V_f$$

when the Hall-effect probe 22 behaves like a closed switch.

Consequently, the signal Vs at the output of the sensor 2 is a composite signal incorporating the signal $V_{22}$ generated by the Hall-effect probe 22 and the signal Vf generated by the Hall-effect probe 26. More specifically, the signal Vs is the sum of the signal $V_{22}$ generated by the Hall-effect probe 22

$$\left(\text{multiplied by the factor} - \frac{Ra_1}{Ra_2}\right)$$

and the signal Vf generated by the Hall-effect probe 26

$$\left(\text{multiplied by the factor}\left[1 + \frac{Ra_1}{Ra_2}\right]\right).$$

As illustrated in FIG. 3, the discontinuities D of the signal $V_{22}$ generated by the first probe are contained in the output signal Vs. In other words, the discontinuities d of the output signal Vs correspond to the discontinuities D of the signal $V_{22}$ generated by the first probe. $Ra_1$ and $Ra_2$ are chosen such that the variation Vv of the output signal Vs, due to the variations of the signal Vf generated by the second Hall-effect probe 26 between two discontinuities d, is less than the value of the discontinuities Vd of the output signal Vs. Thus, a value of the output signal Vs has only one corresponding angular position of the rotary member 12, between 0° and 360°.

The analysis means 4 are linked only to the output 50 of the sensor 2. They mainly comprise a microcontroller 36, a high-pass filter 42 and a flip-flop 44.

The microcontroller 36 comprises an analog input 38 receiving the signal Vs via a by-pass 46. Given the univalent relationship between the output signal Vs and the angular position of the rotary member 12, the microcontroller 36 defines, from the output signal Vs obtained by its analog input 38, the absolute angular position over 360° of the rotary member 12.

The microcontroller 36 also comprises a digital input 40. This digital input 40 receives the output signal Vs after filtering in the high-pass filter 42 comprising a capacitor Cph and a resistor Rph. The high-pass filter 42 is used to eliminate the variations of the signal Vs due to the signal Vf generated by the second Hall-effect probe 26 to allow only the pulses due to the signal $V_{22}$ to pass. The digital input 40, sensitive to signal edges, makes it possible to determine the number of discontinuities of the signal Vs per unit of time by using the interrupts from the microcontroller 36 and to deduce from them the rotation speed of the rotary member 12.

The RST type flip-flop 44, inserted between the high-pass filter 42 and the digital input 40 of the microcontroller 36, makes it possible, if necessary, to produce a simple rising edge per revolution.

The flip-flop 44 can be dispensed with if the input 40 of the microcontroller is of the type with pulse width variation, and if the filtered signal Vs at the output of the high-pass filter 42 is compatible with the logic levels of the microcontroller 36.

It would be possible to determine the rotation speed of the rotary member from the analog input of the microcontroller 36. However, this would require a very high sampling rate to determine the edges corresponding to the discontinuities of the signal Vs. Such a solution is not therefore advantageous.

Of course, the invention is by no means limited to the embodiment that has just been described as a non-limiting example. Thus, although the first probe is binary and generates only two signal levels in the embodiment described above, it would be possible to provide for the generation of more than two electrical signal levels, for example to improve the accuracy with which the position of the rotary member is determined or to use a second probe of a different type from that of the embodiment described above.

The invention claimed is:

1. A device (1) for determining the angular position over 360° and rotation speed of a rotary member (12), driven by a rotation movement (32) about a rotation direction, said device comprising:
a sensor (2) consisting of a fixed part (6) and a rotary part (8) linked to the rotary member (12), said rotary part bearing a magnetic flux generator (14) and said fixed part comprising:
a first probe (22) generating a binary electrical signal ($V_{22}$) having two different levels as a function of the angular position of the rotary member, each level corresponding to a range of angular positions of the rotary member covering a segment of revolution, said levels being separated from each other by a discontinuity (D),
a second probe (26) angularly offset in relation to the first probe (22) and generating an electrical signal (Vf) as a univalent function of the angular position of the rotary member for each of the segments of revolution corresponding to a level of the electrical signal generated by the first probe,
analysis means (4) comprising first means (36, 38, 46) univalently defining over 360° the angular position of the rotary member,
characterized in that:
the sensor (2) also comprises a summing assembly (28) having an output (50) at which is generated an output signal (Vs), said assembly summing the electrical signal ($V_{22}$) generated by the first probe (22) and the electrical signal (Vf) generated by the second probe (26), such that the output signal (Vs) comprises discontinuities (d) corresponding to the discontinuities (D) of the electrical signal generated by the first probe (22) and that the variation (Vv) of the output signal (Vs) between two discontinuities (d) is less than the value (Vd) of the discontinuities (d) of the output signal (Vs),
the analysis means (4) are linked to the output (50) of the sensor (2); the analysis means also include second means (36, 40, 42, 44) calculating the rotation speed of the rotary member.

2. The device as claimed in claim 1, characterized in that the second means (36, 40, 42, 44) calculate the rotation speed of the rotary member as a function of the number of discontinuities (d) of the output signal (Vs), per unit of time.

3. The device as claimed in claim 2, characterized in that the analysis means (4) comprise a microcontroller (36) having an analog input (38) belonging to the first means (36, 38, 46) and a digital input (40) belonging to the second means (36, 40, 42, 44).

4. The device as claimed in claim 1, characterized in that the analysis means (4) comprise a microcontroller (36) having an analog input (38) belonging to the first means (36, 38, 46) and a digital input (40) belonging to the second means (36, 40, 42, 44).

5. The device as claimed in claim 4, characterized in that the second means (36, 40, 42, 44) also comprise a high-pass filter (42) upstream of the digital input (40) of the microcontroller and the first means (36, 38, 46) comprise a by-pass (46) upstream of the high-pass filter (42) feeding the analog input (38).

6. The device as claimed in claim 1, characterized in that the rotary part (8) comprises a magnet (14) generating said magnetic flux, the direction of magnetization of which is perpendicular to the rotation axis of the rotary part (12) and the fixed part (6) is positioned around the magnet (14) and delimits two air gaps (18, 20) offset by roughly 90°, in which are placed the first (22) and second (26) probes.

7. The device as claimed in claim 1, characterized in that the variation of the electrical signal (Vf) generated by the second probe (26) as a function of the angular position of the rotary member (12) is inverted for the angular positions of the rotary member corresponding to a discontinuity (D) of the electrical signal ($V_{22}$) generated by the first probe (22).

8. The device as claimed in claim 1, characterized in that the first (22) and the second (26) probes are Hall-effect probes.

9. The device as claimed in claim 8, characterized in that the first probe (22) is a Hall-effect Switch probe of flip-flop type generating a binary electrical signal ($V_{22}$).

10. The device as claimed in claim 9, characterized in that the output (24) of the first probe (22) is linked to a voltage power source (Vcc), and the output of the first probe (22) and the output of the second probe (26) are linked to an assembly (28) summing the electrical signal ($V_{22}$) generated by the first probe (22) and the electrical signal (Vf) generated by the second probe (26).

* * * * *